United States Patent [19]

Pruckmayr et al.

[11] 4,120,903

[45] Oct. 17, 1978

[54] METHOD FOR PREPARING POLY(TETRAMETHYLENE ETHER) GLYCOL

[75] Inventors: Gerfried Pruckmayr, Media, Pa.; Robert H. Weir, Nashville, Ind.

[73] Assignee: E. I. Du Pont de Nemours and Company, Wilmington, Del.

[21] Appl. No.: 782,735

[22] Filed: Mar. 30, 1977

[51] Int. Cl.$^2$ ................. C07C 41/02; C07C 41/00
[52] U.S. Cl. ............................................ 260/615 B
[58] Field of Search .................................. 260/615 B

[56] References Cited

U.S. PATENT DOCUMENTS

| | | | |
|---|---|---|---|
| 2,751,419 | 6/1956 | Hill et al. ........................ | 260/615 B |
| 3,072,582 | 1/1963 | Frost .......................... | 260/615 B UX |
| 3,282,875 | 11/1966 | Connolly et al. .................... | 260/29.6 |
| 3,454,652 | 7/1969 | Dunlop et al. .................... | 260/615 B |
| 3,624,053 | 11/1971 | Gibbs et al. ........................ | 260/76.3 |

OTHER PUBLICATIONS

USPB 717 Uber die Polymerisation des Tetrahydrofurans, Jan. 11, 1946, 22 pages.

*Primary Examiner*—Howard T. Mars

[57] ABSTRACT

Poly(tetramethylene ether) glycol is prepared by polymerizing tetrahydrofuran, using (1) a polymeric catalyst which contains sulfonic acid groups, and
(2) a chain terminator which is water or 1,4-butanediol.

4 Claims, No Drawings

METHOD FOR PREPARING POLY(TETRAMETHYLENE ETHER) GLYCOL

BACKGROUND OF THE INVENTION

Poly(tetramethylene ether) glycol (PTMEG) is a commodity in the chemical industry, widely used in the manufacture of polyurethanes and polyesters. It is commonly prepared by reacting tetrahydrofuran (THF) with a strong acid catalyst and then quenching the product with water.

While this process has proved to be quite satisfactory, it is not as efficient as desired because the acid catalyst cannot be recovered and reused. Moreover, disposal of the spent acid is a problem because of its toxicity and corrosiveness.

It has now been found that PTMEG can be prepared by polymerizing THF, using (1) a catalyst which, although more complex than that, can for purposes of summary be described as a polymer containing alpha-fluorosulfonic acid groups, and (2) a chain terminator which is water or 1,4-butanediol.

The nature of the catalyst permits its reuse, thereby eliminating the disposal problem, and the catalyst's low solubility in the reaction mass makes it easy to separate the product from the catalyst at the end of the polymerization reaction. This low solubility also minimizes loss of catalyst as the reaction proceeds.

SUMMARY OF THE INVENTION

The process of the invention comprises simply bringing the THF reactant, the catalyst and the chain terminator together under conditions suitable for polymerization.

The reaction is shown in the following illustrative equations:

(1) 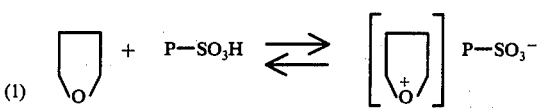

(2) 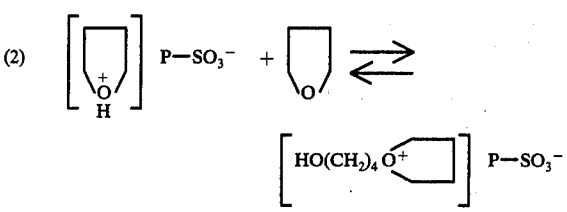

(3) 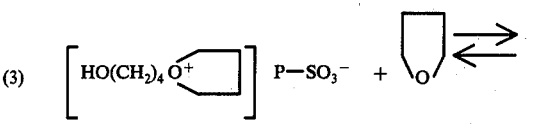

(4) 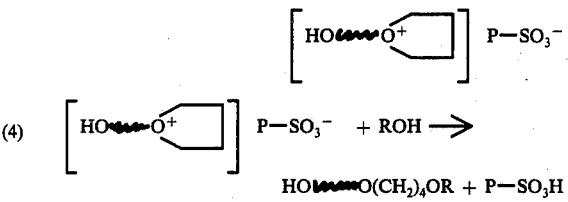

$$HO\sim\sim O(CH_2)_4OR + P-SO_3H$$

In these equations:

P represents the polymer segment of the catalyst;
R is hydrogen or $-(CH_2)_4OH$; and
$\sim\sim$ represents the poly(tetramethylene ether) chain.
When the reaction is complete, the catalyst can be separated from the reaction mass and reused.

DETAILED DESCRIPTION OF THE INVENTION

The THF used as the reactant in the process of the invention can be any of those commercially available. It preferably has a water content of less than about 0.001%, by weight, and a peroxide content of less than 0.002%, by weight, and preferably contains an oxidation inhibitor such as butylated hydroxytoluene to prevent formation of undesirable byproducts and color.

The catalysts used in the process of the invention are polymers of ethylenically unsaturated monomers containing groups of the formula

or

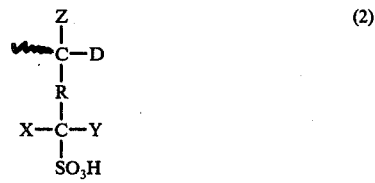

where $\sim\sim$ represents the polymer chain or a segment thereof;

D is hydrogen, an aliphatic or aromatic hydrocarbon radical of 1 to 10 carbon atoms, a halogen atom or a segment of the polymer chain;

X and Y are hydrogen, an aliphatic or aromatic hydrocarbon radical of 1 to 10 carbon atoms or fluorine, but at least one must be fluorine;

R is a linear or branched linking group having up to 40 carbon atoms in the principal chain, and Z is hydrogen, an aliphatic or aromatic hydrocarbon radical of 1 to 10 carbon atoms or halogen.

The linking group defined by R in formula (2) can be a homogeneous one such as an alkylene radical, or it can be a heterogeneous one such as an alkylene ether radical. In the preferred catalysts, this linking radical contains 1 to 20 carbon atoms in the principal chain. In the especially preferred catalyst, R is a radical of the structure

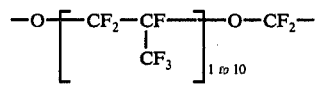

The catalysts of formulas (1) and (2) have equivalent weights of 900 to 1,500, preferably 1,100 to 1,300. Equivalent weight of a catalyst is that weight in grams which contains one gram equivalent weight of sulfonic acid groups, and can be determined by titration.

Illustrative of the ethylenically unsaturated monomers which can be used to prepare these polymer chains are ethylene, styrene, vinyl chloride, vinyl fluoride, vinylidene fluoride, chlorotrifluoroethylene (CTFE), bromotrifluoroethylene, vinyl ethers, perfluoroalkyl vinyl ethers, tetrafluoroethylene, hexafluoropropylene, and combinations of these.

The —SO₃H groups are introduced into the catalyst polymer chain by copolymerizing these ethylenically unsaturated monomers with such ethylenically unsaturated monomers as trifluorovinyl sulfonic acid, linear or branched chain vinyl monomers containing sulfonic acid group precursors or perfluoroalkylvinyl ethers containing sulfonic acid group precursors. This can be done according to the procedures described in U.S. Pat. No. 3,784,399 to Grot, and the patents cited therein. Monomer ratios are selected to give the resulting polymer the proper equivalent weight.

The catalyst preferably has a solubility such that no more than about 5%, by weight, dissolves in the reaction mass at the reaction temperature. This solubility is determined gravimetrically.

It is desirable that the solubility of the catalyst be as low as possible because this minimizes catalyst loss and permits the process to be run for longer periods without catalyst replenishment. Preferably, the solubility is no more than about 1%, by weight, and even more preferably is below the threshold of detection with present analytical techniques.

The catalyst should be effectively free of functional groups, other than —SO₃H groups, which might interfere with the polymerization reaction. "Effectively free" means the catalyst may contain a small amount of such groups, but not so many that the reaction is affected adversely or the product contaminated. Illustrative of such groups are carboxyl groups, hydroxyl groups and amino groups.

Catalysts whose polymer chains are of fluorocarbon monomers are preferred for use in the process of the invention. Illustrative of such monomers are tetrafluoroethylene (TFE), hexafluoropropylene, CTFE, bromotrifluoroethylene and perfluoroalkyl vinyl ethers. Mixtures of monomers can also be used.

Even more preferred as catalysts are copolymers of TFE or CTFE and a perfluoroalkyl vinyl ether containing sulfonic acid group precursors. Most preferred in this class are copolymers of TFE or CTFE and a monomer represented by the structure.

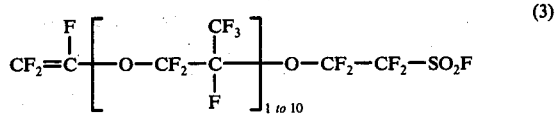
(3)

These polymers are prepared in the sulfonyl fluoride form and are then hydrolyzed to the acid form, as described in U.S. Pat. No. 3,692,569.

Most preferred as catalysts are copolymers of TFE and monomers of formula (3) in which the respective monomer weight ratios are 50-75/25-50. Such copolymers, having equivalent weights of 943, 1100, 1150 and 1500, are sold by E. I. du Pont de Nemours and Company as Nafion ® perfluorosulfonic acid resins.

The chain terminators used in the process of the invention are water and 1,4-butanediol. Water is preferred for its low cost.

The polymerization reaction is carried out by charging a reaction vessel with THF and about 0.1 to 10%, preferably about 5 to 10%, by weight of the THF, of catalyst. It has been found that use of a dry catalyst significantly increases reaction speed. It is best that the catalyst be as dry as possible, but removing all the water is difficult, so in the usual case the catalyst is dried by holding it at about 110° C and a pressure of about 0.1 mm of mercury until it reaches constant weight.

The reaction mass is then held, with stirring or agitation, at a temperature ranging from ambient temperature to the boiling point of THF, preferably 20° to 40° C. If higher reaction temperatures are desired, the reaction can be run at pressures up to about 5,000 atmospheres.

Polymerization is allowed to continue until the desired degree of conversion has been obtained, as determined by periodic sampling and analysis for unreacted THF as, for example, by nuclear magnetic resonance. This point is ordinarily reached in 2 to 65 hours, the time depending, of course, on the reaction temperature and the catalyst concentration.

The polymerization reaction is then stopped by adding a stoichiometric excess of chain terminator to the reaction mass. Preferably, the terminator is added as a mixture with THF.

When termination is complete, the catalyst can be separated from the reaction mass by filtration, centrifugation or decantation, and again dried, if necessary, for reuse.

The process of the invention can be run batchwise or continuously. When run continuously, the THF and chain terminator, and optionally the catalyst, are continuously fed into a reactor at rates which provide the requisite concentrations and which provide a suitable residence time, and product and excess reactants are continuously removed. Preferably, the catalyst is charged initially and is held in the reaction zone by suitable screens or filters, and can remain in continuous use.

After the reaction mass is withdrawn from the reactor, whether it be a batch reactor or a continuous reactor, it is separated from unreacted THF and unreacted chain terminator by conventional techniques, to give the PTMEG product.

EXAMPLE

Nafion ® resin, equivalent weight 943, was dried to constant weight at 110° C under a vacuum of 0.1 mm of mercury. Five grams of this catalyst were mixed with 100 g of THF dried over sodium and the mixture held, with stirring, at 25° C, in a nitrogen purged polymerization kettle equipped with drying tubes to exclude moisture. The conversion to polymer increased gradually, as determined by NMR spectroscopy of the reaction mixture. After 7 hours, conversion was 25%; after 23 hours it was 54%; after 65 hours it had increased to 55.6%.

At that point, the viscous reaction mixture was diluted with about 50 ml of a 1:1 (by volume) mixture of THF and water, and the catalyst was removed by filtration. Unreacted THF was removed from the filtrate by distillation under reduced pressure. The filtrate was then added to toluene, and the aqueous phase which formed was removed. The remaining water was removed from the toluene layer by azeotropic distillation at atmospheric pressure and the residue then dried at a pressure of 0.1 mm of mercury and at 80° C, to give 54 g of PTMEG product having a molecular weight (number average) of about 10,000.

A 1:1 mixture of THF and 1,4-butanediol can be used in place of the THF/water mixture, with substantially the same result.

We claim:

1. In a process for preparing poly(tetramethylene ether) glycol by polymerizing tetrahydrofuran using water or 1,4-butanediol as a chain terminator, the improvement comprising using as a catalyst a polymer of monoethylenically unsaturated monomers, the polymer being effectively free of functional groups which interfere with the polymerization and containing groups of the formula

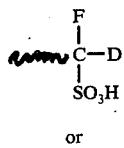

or

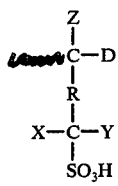

where

~~~represents the polymer chain or a segment thereof;

D is hydrogen, an aliphatic or aromatic hydrocarbon radical of 1 to 10 carbon atoms, a halogen or a segment of the polymer chain;

X and Y are hydrogen, an aliphatic or aromatic hydrocarbon radical of 1 to 10 carbon atoms, or fluorine, but at least one of X and Y must be fluorine;

R is a linear or branched linking group having up to 40 carbon atoms in the principal chain; and Z is hydrogen, an aliphatic or aromatic hydrocarbon radical of 1 to 10 carbon atoms, or halogen.

2. The process of claim 1 wherein the catalyst is a polymer of fluorocarbon monomers.

3. The process of claim 2 wherein the catalyst is a copolymer of tetrafluoroethylene or chlorotrifluoroethylene and R is

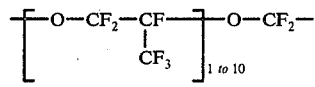

4. The process of claim 3 wherein the catalyst is a hydrolyzed copolymer of tetrafluoroethylene or chlorotrifluoroethylene and a monomer represented by the structure

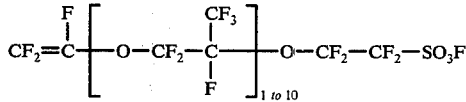

the tetrafluoroethylene or chlorotrifluoroethylene and monomer units being present in weight ratios of 50–75/25–50, respectively.

* * * * *